US006644175B2

(12) United States Patent
Stephen et al.

(10) Patent No.: US 6,644,175 B2
(45) Date of Patent: Nov. 11, 2003

(54) BARBECUE GRILL COOKING SURFACE ASSEMBLY (75) Inventors: Robert T. Stephen, Barrington, IL (US); Adrian A. Bruno, Rolling Meadows, IL (US); J. Michael Alden, Palatine, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/945,548

(22) Filed: Aug. 30, 2001

(65) Prior Publication Data

US 2003/0041744 A1 Mar. 6, 2003

(51) Int. Cl.[7] .............................................. A47J 37/06
(52) U.S. Cl. ........................ 99/339; 99/340; 99/400; 99/425; 99/446; 99/450; 126/41 R
(58) Field of Search .................. 99/339, 340, 400, 99/422, 425, 445, 446, 450; 126/25 R, 9 R, 41 R (56) References Cited

U.S. PATENT DOCUMENTS

| 2,175,043 A | * | 10/1939 | Vandegrift ............. 99/425 |
| 2,211,545 A | * | 8/1940 | Osborne ............... 99/425 |
| 2,304,140 A | | 12/1942 | Bergholm |
| 2,817,331 A | | 12/1957 | Kaplan et al. |
| 2,907,316 A | | 10/1959 | Windust |
| 3,245,398 A | | 4/1966 | Baker |
| 4,403,541 A | | 9/1983 | Berger |
| 4,432,334 A | | 2/1984 | Holt |
| 4,569,279 A | | 2/1986 | Avner |
| 4,587,948 A | | 5/1986 | Haglund |
| 4,606,261 A | | 8/1986 | Bernardi |
| 4,696,282 A | | 9/1987 | Incitti |
| 4,930,491 A | * | 6/1990 | Purello ............... 99/425 X |
| 4,979,440 A | * | 12/1990 | Latour et al. ......... 99/425 X |
| 5,009,151 A | | 4/1991 | Hungerford |
| 5,163,358 A | | 11/1992 | Hanagan et al. |
| 5,299,931 A | | 4/1994 | Lee |
| 5,490,452 A | | 2/1996 | Schlosser et al. |
| 5,678,531 A | | 10/1997 | Byers et al. |
| 5,839,361 A | | 11/1998 | Richter |
| 6,267,047 B1 | | 7/2001 | Mosher, II et al. |

OTHER PUBLICATIONS

Undated miscellaneous page from Brochure of "Accessoires" from Solimar/United Four Co., Ltd. (date unknown).

* cited by examiner

Primary Examiner—Reginald L. Alexander
(74) Attorney, Agent, or Firm—Wallenstein Wagner & Rockey, Ltd.

(57) ABSTRACT

The present invention relates to a barbecue grill assembly 10 including a cooking surface assembly 12 positioned in a cooking chamber 14. The cooking surface assembly 12 includes a first portion or griddle 16 and a second portion or grate 18. The second portion or grate 18 has a plurality of openings 32 and a plurality of ribs 33. A transition wall 40 is positioned between the first portion 16 and the second portion 18. A duct 46 depends from a lower surface 48 of the first portion 16. The duct 46 has an end 47 that is cooperatively positioned with the aperture 30 to form a passageway or channel 50. The passageway 50 is adapted to permit the drainage of grease and other byproducts generated by cooking food on the assembly 12 past a plurality of burner tubes and to a lower portion of the cooking chamber 14.

25 Claims, 4 Drawing Sheets

BARBECUE GRILL COOKING SURFACE ASSEMBLY

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a barbecue grill cooking surface assembly. More specifically, the present invention relates to a cooking surface assembly for use within a cooking chamber of a barbecue grill.

BACKGROUND OF THE INVENTION

As the popularity of gas barbecue grills has increased, manufacturers have introduced a number of accessories for use with these grills. One type of accessory is an insert for use within the cooking chamber of the grill. Conventional insert designs have a griddle portion with a generally flat surface and a grate portion with a plurality of elongated or circular openings.

Typically, the insert is positioned within the cooking chamber and above a heating element. When the grill has existing grates, those grates can be removed from the cooking chamber and the insert is placed therein. Alternatively, the insert is positioned on the existing grates. The vast majority of inserts are sheet metal and have a thin-wall construction to facilitate heat transfer through the insert.

A concern with inserts of this type is that grease and other byproducts generated by cooking food on the insert drains through the openings and onto the heating elements located below the insert. When the grease and byproducts come into contact with the heating elements, the grease rapidly ignites causing a flare-up. The size of the flare-up increases as the quantity of grease contacting the heating element increases. Flare-ups can also result from grease contacting other cooking chamber components positioned below the insert. Flare-ups decrease the life of the heating elements and can negatively effect other grill components. In addition, flare-ups can unexpectedly burn food located on the insert.

A second concern is the accumulation of grease and byproducts on the upper surface of the insert which can negatively effect the cooking process. A related concern is the accumulation of grease and byproducts within the openings of the grate portion of the insert. Over time, the openings can become partially or fully clogged. In an attempt to remedy these conditions, a number of conventional inserts have a drain opening. A user moves grease and byproducts to the drain opening wherein the grease and byproducts haphazardly pass through the opening and either come into contact with the heating element or accumulate in some portion of the cooking chamber. In the former case, the flare-ups described in the previous paragraph result. In the latter case, the grease and byproducts continue to accumulate in portions of the cooking chamber. The accumulated grease and byproducts can negatively effect the performance and operation of the grill components, including but not limited to the heating elements.

An example of inserts susceptible to such concerns identified above is U.S. Pat. No. 6,267,047 to Mosher et al. Referring to FIG. 2B therein, an insert 10 is shown having a griddle 22 and a cooking surface with raised ribs 23. An opening 25 is located at one end of the insert 10 to drain grease and byproducts generated during the cooking process. The ribs 23 are designed to induce the flow of grease into the opening 25 where it drains into a drip tray 1 positioned roughly below the opening 25. Because there is no structure between the opening 25 and the drip tray 1 to guide the flow and movement of grease, the drainage is uncontrolled. As a result, the grease and byproducts can accumulate in unexpected areas and a number of the negative concerns identified above can result.

Another example of an insert with the concerns identified above is U.S. Pat. No. 5,839,361 to Richter. As shown in FIG. 5 therein, the insert 50 has a grill section 54 formed from a number of slots 56, and a griddle section 56. The griddle section 56 has a plurality of ventilation openings 58 that permit smoke to flow around and flavor food being prepared on the griddle section 56. There is no structure between either the grill section 54 or the griddle section 56 to guide the flow and drainage of grease and byproducts of the cooking process. Accordingly, the drainage of grease and byproducts is uncontrolled and the insert 50 is prone to the negative concerns identified above.

Therefore, there is a definite need for a cooking surface assembly that ensures the controlled drainage of grease and byproducts to avoid contact with the heating elements and to prevent accumulations which negatively effect the performance of the barbecue grill components. Also, there is a need for a cooking surface assembly that is durable and can be removably positioned within the cooking chamber of the barbecue grill. In addition, there is a need for a cooking surface assembly that partitions the cooking chamber to create distinct heating or cooking zones such that the temperature fo the zones can be individually controlled and regulated during the cooking process.

The present invention is provided to solve these and other problems.

SUMMARY OF THE INVENTION

The present invention relates to a barbecue grill assembly including a cooking chamber and a cooking surface assembly removably positioned therein. The cooking chamber has at least one heating element, for example a gas burner, positioned in a lower portion of the cooking chamber. The gas burner can have a plurality of burner areas. The gas burner can be a burner tube and multiple burner tubes can be located in the cooking chamber.

The cooking surface assembly has a first portion with a griddle cooking surface and an aperture, and a second portion with a plurality of openings forming a grate cooking surface. Also, the cooking surface assembly has a duct depending from a lower surface of the first portion. The duct has a length and is cooperatively positioned with the aperture to form a passageway. The passageway is adapted to receive grease and byproducts generated during the cooking process from the aperture. The passageway drains grease and byproducts towards the lower portion of the cooking chamber and away from the gas burner.

A peripheral portion of the cooking assembly surface is adapted to engage an inner surface of the cooking chamber to support the cooking surface in a use position. In the use position, a first burner area is generally positioned below the griddle surface, and a second burner area is generally positioned below the grate surface. The cooking chamber has a plurality of distinct zones. The first burner area is cooperatively positioned with the first zone and the second burner area is cooperatively positioned with the second zone. The zones are substantially defined by a wall positioned within the cooking chamber. This means that the wall is adapted to partition the first and second burner tubes to form a plurality of discrete heating zones. Preferably the wall depends from the lower surface of the cooking assembly and is positioned adjacent the passageway. Alternatively, the wall extends from a lower portion of the cooking chamber.

The first and second burner areas are adapted for independent heat adjustment of the zones of the chamber. Accordingly, the temperature of each of the zones can be independently controlled and monitored during the cooking process. This increases the versatility and value of the cooking surface assembly.

In a cooking chamber having two burner tubes as heating elements, the first portion is generally positioned above the first burner tube and the second portion is generally positioned above the second burner tube. The passageway drains and channels grease and byproducts to the lower portion of the cooking chamber and past the first and second burner tubes. In addition, the passageway is adapted to channel the grease and byproducts to a collection point within the cooking chamber or to a discharge port for collection beyond the cooking chamber.

Other features and advantages of the invention will be apparent from the following specification taken in conjunction with the following drawings.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
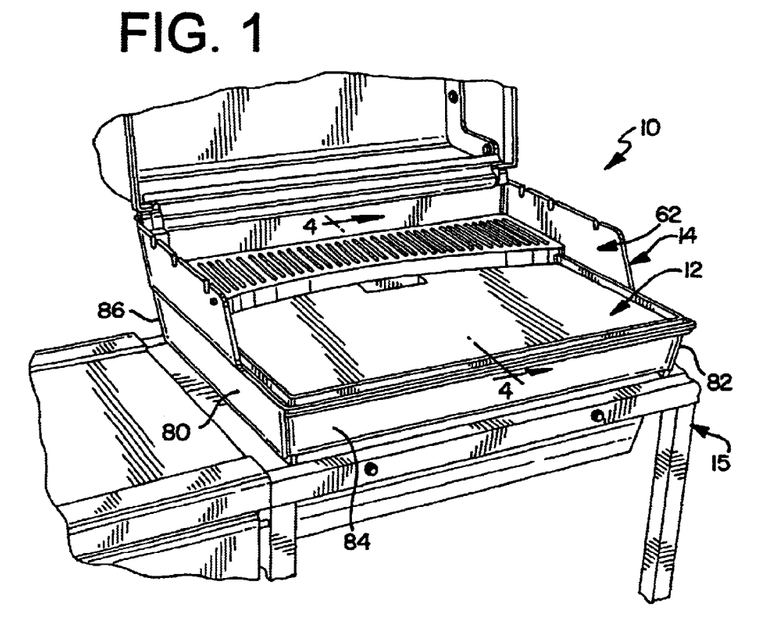
FIG. 1 is a perspective view of a cooking surface assembly of the present invention, the cooking surface assembly shown positioned within a cooking chamber of a barbecue grill.

A barbecue grill assembly 10 is shown in FIG. 1. The barbecue grill assembly 10 includes a cooking chamber 14 and a cooking surface assembly 12 positioned therein. The cooking chamber 14 is supported by a cart frame 15. The cooking chamber 14 includes a gas burner (not shown) positioned in a lower portion of the cooking chamber 14. The gas burner can include a plurality of burner areas. Alternatively, the gas burner can include a plurality of gas burner tubes.

Figure 2:
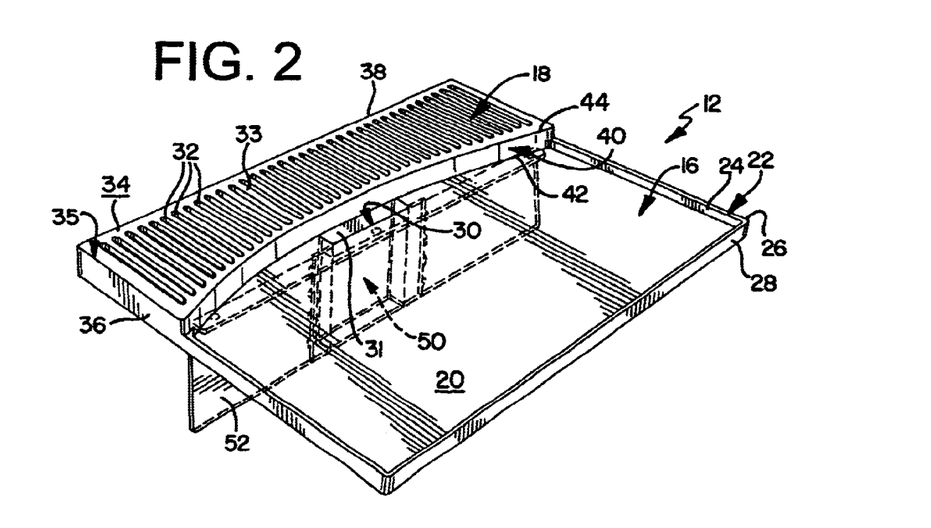
FIG. 2 is a perspective view of the cooking surface assembly of FIG. 1.

Referring to FIG. 2, the cooking surface assembly 12 includes a first portion or griddle 16 and a second portion or grate 18. The first portion 16 is adapted to support food while it is cooked in the cooking chamber 14. The first portion 16 has a griddle surface 20 and a peripheral portion 22 wherein the surface 20 is located inward of the peripheral portion 22. Although shown as being generally flat or smooth, the surface 20 can have an elevated or depressed area, or a plurality of elevated or depressed areas. The peripheral portion 22 comprises an inner wall 24, a top wall 26, and an outer wall 28.

The first portion 16 has an aperture 30. The aperture 30 has an inner wall 31. Although shown positioned in a rear area of the first portion 16, the aperture 30 can be positioned in a variety of locations in the first portion 16. The dimensions and configuration of the aperture 30 can vary with the design parameters of the cooking surface assembly 12.

The second portion or grate 18 has a plurality of openings 32 and a plurality of ribs 33, where each rib 33 is positioned between two openings 32. Preferably, the openings 32 are elongated, however, the dimensions and configuration of the openings 32 can vary with the design parameters of the cooking surface assembly 12. The second portion 18 has a grate surface 34 formed from the openings 32. The texture of the surface 34 can vary depending upon the configuration of the openings 32. The second portion 18 is adapted to support food while it is cooked in the cooking chamber 14. The second portion 18 has a peripheral portion 35 that includes opposed side walls 36 and a back wall 38.

Referring to FIG. 2, a transition wall 40 is positioned between the first portion 16 and the second portion 18. The wall 40 extends between an edge 42 of the first portion 16 and an edge 44 of the second portion 18. The edge 42 is the boundary between the first portion 16 and the wall 40. Similarly, the edge 44 is the boundary between the second portion 18 and the wall 40. Preferably, the wall 40 is substantially vertical, however, the wall 40 can be angled with a small slope. The wall 40 functions as a barrier to aid the cooking of food positioned on the first portion 16. Although shown as having a curvilinear configuration, the dimensions and configuration of the wall 40 can vary with the design parameters of the cooking surface assembly 12. The aperture 30 can be positioned in a portion of the wall 40.

Figure 3:
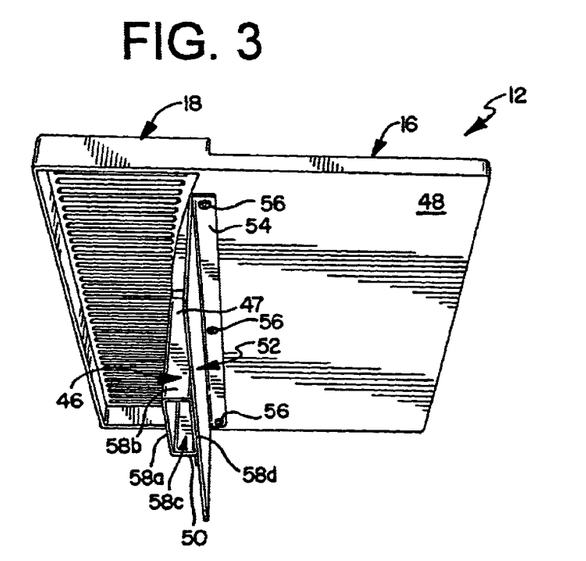
FIG. 3 is a perspective of the cooking surface assembly of FIG. 1 showing a lower portion.

As shown in FIGS. 2 and 3, a duct 46 depends from a portion of a lower surface 48 of the first portion 16. The duct 46 has a length $L_D$. The duct 46 has a first wall 58a, a second wall 58b, a third wall 58c, and a fourth wall 58d. The duct 46 can have a greater or lesser number of walls depending upon its configuration. The duct 46 has an end 47 that is cooperatively positioned with the aperture 30 to form a passageway or channel 50. Preferably, the end 47 engages a portion of the inner wall 31 of the aperture 30. The passageway 50 has a length $L_P$. The passageway 50 is adapted to permit the drainage of grease and other byproducts generated by cooking food on the cooking surface assembly 12 to a lower portion 78 of the cooking chamber 14. Accordingly, grease and byproducts from the cooking surface assembly 12 can be drained through the aperture 30 and the duct 46. Although shown as having a tubular configuration, the dimensions and configurations of the duct 46 can vary with the design parameters of the cooking surface assembly 12. However, to form the passageway 50, the end 47 of the duct 46 must be cooperatively positioned or aligned with the aperture 30.

A wall 52 depends from the lower surface 48 of the first portion 16. Alternatively, the wall 52 depends from a lower surface 49 of the second portion 18. Preferably, the wall 52 is positioned proximate the aperture 30, duct 46, and the passageway 50. Alternatively, the wall 52 is spaced a distance from the aperture 30, duct 46, and the passageway 50. The wall 52 has a length $L_W$. The wall 52 has a mounting portion 54, which connects the wall 52 to the lower surface 48. Fasteners 56 can be used to connect the mounting portion 54 to the lower surface 48. The wall 52 is adapted to provide support to the duct 46. As detailed below, the wall 52 is further adapted to partition a portion of the cooking chamber 14 when the cooking surface assembly 12 is positioned in the cooking chamber 14.

Alternatively, the aperture 30, the duct 46, and a portion of the wall 52 combine to form the passageway 50. In this configuration, the fourth wall 58d of the duct 46 is removed and the wall 52 is positioned proximate the duct 46 to engage the second wall 58b and the third wall 58c and form the passageway 50. In another alternative, the aperture 30 is positioned in the second portion 18 and the duct 46 are cooperatively positioned with the aperture 30 to form the passageway 50 wherein at least a portion of the passageway 50 is positioned below the second portion 18.

Figure 4:
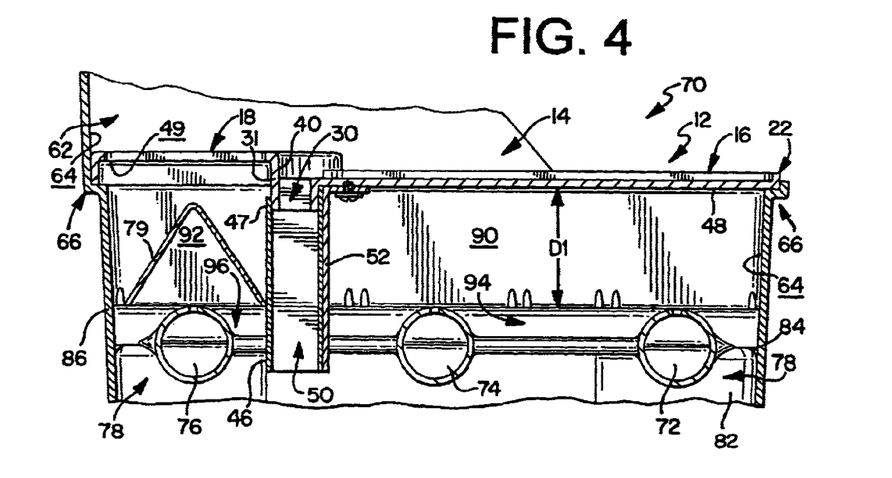
FIG. 4 is a cross-section of the cooking surface assembly of FIG. 1 along line 4—4 of FIG. 1.

Referring to FIGS. 1 and 4, the cooking chamber 14 has an interior space 62. The interior space 62 is roughly defined by the side walls 80, 82, the front wall 84, and the back wall 86. The cooking surface assembly 12 is cooperatively dimensioned with the interior space 62. This means that the configuration of the cooking surface assembly 12 is such that the assembly 12 is positioned within the cooking chamber 14. Preferably, the cooking surface assembly 12 is removably positioned within the cooking chamber 14. The cooking surface assembly 12 can have a variety of configurations, including square, rectangular, or curvilinear.

Within the interior space 62, the cooking chamber 14 has a plurality of distinct zones. The zones are substantially defined by the wall 52. Referring to FIG. 4, a first zone 90 is divided from a second zone 92 by the wall 52. Alternatively, a wall extending from the lower portion 78 of the cooking chamber 14 defines the zones. The zones 90, 92 are cooperatively positioned with the burner areas 94, 96, meaning that the first zone 90 is cooperatively positioned with the first burner area 94 and the second zone 92 is cooperatively positioned with the second burner area 96. In general terms, each zone begins above its respective burner area. The number of zones 90, 92 can be varied by adding additional walls 52 and/or burner areas 94, 96.

A portion of the cooking assembly 12 is adapted to engage the cooking chamber 14 to support the cooking surface assembly 12 within the interior space 62 to define a use position 70. Specifically, the peripheral portions 22, 35 engage an inner surface 64 and/or ledge 66 of the cooking chamber 14 to support the cooking surface assembly 12 in the use position 70.

In the use position 70, the cooking surface assembly 12 is positioned above the heating element, which is generally positioned in the lower portion 78 of the cooking chamber 14. As shown in FIG. 4, the heating element comprises burners tubes 72, 74, 76. The first portion 16 is spaced a first distance D1 from the first burner tube 72 and the second burner tube 74, and the second portion 18 is spaced a second distance D2 from the third burner tube 76. Thus, there is a void or cavity between the first and second portions 16, 18 and the burner tubes 72, 74, 76. The first distance D1 is greater than the second distance D2 and as a result, the first portion 16 to be positioned closer to the burner tubes 72, 74 than the second portion 18 is positioned to the burner tube 76.

As shown in FIG. 4, in the use position 70, the aperture 30 and the duct 46 are positioned between the second burner tube 74 and the third burner tube 76. Consequently, the passageway or channel 50 is positioned between the second burner tube 74 and the third burner tube 76. Due to its position, the passageway 50 permits the drainage and/or removal of grease and other byproducts generated by cooking food on the cooking surface assembly 12 past the burner tubes 72, 74, 76. Described in a different manner, the passageway 50 ensures that grease and byproducts drained from the cooking surface assembly 12 avoid contact with the burner tubes 72, 74, 76. Due to its length $L_P$, the passageway 50 permits the drainage and/or removal of grease and byproducts to a lower portion 78 of the cooking chamber 14. The passageway 50 can drain grease and byproducts to a discharge port (not shown) located in a sidewall of the cooking chamber 14. The passageway 50 can have narrowed walls to channel the grease and byproducts to a collection point or the discharge port. Accordingly, the passageway 50 facilitates the controlled drainage of grease and byproducts and precludes burner flare-ups, which result when grease and byproducts contact the burner tubes 72, 74, 76. The controlled drainage increase the longevity of the burner tubes 72, 74, 76 and prevents premature wear of the burner tubes 72, 74, 76.

Alternatively, the cooking chamber 14 has only two burner tubes and the first portion 16 is positioned above a first burner and the second portion 18 is positioned above a second burner. In this alternate configuration, the passageway 50 is positioned between the first and second burners.

The grease and byproducts generated by cooking food on the first portion 16 are drained and channeled for collection and/or removed by the passageway 50. An accessory utensil, such as a metal spatula, is used to move the grease and byproducts from the first portion 16 to the aperture 30 such that it can drain through the passageway 50. Alternatively, the surface 20 of the first portion 16 can be sloped or angled towards the aperture 30 to facilitate migration of grease and byproducts through the passageway 50.

The grease and byproducts generated by cooking food on second portion 18 are drained though the openings 32. A sear bar 79 is positioned between the second portion 18 and the third burner tube 76. The sear bar 79 is adapted to prevent the drainage of grease and byproducts directly onto the third burner tube 76. Alternatively, the grease and byproducts generated by cooking food on the second portion 18 can be drained through the passageway 50. An accessory utensil is used to move the grease and byproducts from the second portion 18 to the aperture 30 such that it can drain through the passageway 50.

The grease and byproducts can be collected at a point below the burner tubes 72, 74, 76 and removed from the cooking chamber 14 for disposal. A drainage tray or pan (not shown) for collecting the grease and byproducts can be connected to the cooking chamber 14 below the lower portion 78. Alternatively, the passageway 50 drains and channels the grease and byproducts to a discharge port or valve in the cooking chamber 14 for collection beyond the cooking chamber 14.

In the use position 70, the wall 52 is positioned between the second burner tube 74 and the third burner tube 76. As a result, the wall 52 partitions and substantially defines the cooking chamber 14 to form the discrete heating zones 90, 92. The first portion 16 is positioned above the first heating zone 90 and the second portion 18 is positioned above the second heating zone 92. The heating zones 90, 92 are bounded by the lower surface 48 of the cooking surface assembly 12, the walls 80, 82, 84, 86 of the cooking chamber 14, the wall 52, and the burner areas 94, 96. The burner areas 94, 96 are adapted to independently heat the heating zones 90, 92. This means that burner area 94 primarily heats zone 90 and burner area 96 primarily heats zone 92. Accordingly, the temperature of each heating zone 90, 92 can be controlled with the controls (not shown) that are coupled to the burner areas 94, 96 thereby creating distinct cooking environments for food positioned on the cooking surface assembly 12. For example, the temperature of the first heating zone 90 and the first portion 16 can be greater than the temperature of the second heating zone 92 and the second portion 18. Thus, the cooking process on each of the first and second portions 16, 18 can be precisely controlled and customized. As a result, the utility of the cooking surface assembly 12 is increased.

The cooking surface assembly 12 can be manufactured from steel, aluminum, or other metals, including metal alloys. The cooking surface assembly 12 can be formed in a number of ways, including cast or stamped.

The cooking surface assembly 12 can have multiple first portions 16 and/or second portions 18. For example, the assembly 12 has a first portion 16 positioned between two distinct second portions 18. In addition, the cooking surface assembly 12 can have multiple apertures 30 and ducts 46 resulting in multiple passageways 50. Each of the multiple passageways 50 can be located at different positions with respect to the burner tubes 72, 74, 76. For example, a first passageway 50 is positioned between the first and second burner tubes 72, 74 and the second passageway 50 is positioned between the second and third burner tubes 74, 76.

As shown in FIGS. 1 and 4, the cooking chamber 14 has a generally rectangular shape with burner tubes 72, 74, 76 oriented between the opposed side walls 80, 82 of the cooking chamber 14. This means that the burner tubes 72, 74, 76 are in a side-to-side configuration. Alternatively, the burner tubes 72, 74, 76 are oriented between the front wall 84 and rear wall 86 of the cooking chamber 14. This means that the burner tubes 72, 74, 76 are in a front-to-rear configuration. In this configuration, the cooking surface assembly 12 is adapted such that the first portion 16 is positioned above the first and second burner tubes 72, 74 and the second portion 18 is positioned above the third burner tube 76.

In another preferred embodiment, an outdoor cooking device (not shown) includes a cooking chamber 14 and a cooking surface assembly 12. The cooking chamber 14 is supported by a mobile frame. The cooking chamber 14 has a gas burner positioned in a lower portion of the cooking chamber 14. Alternatively, the gas burner is positioned proximate to an outer surface of the cooking chamber 14. In this configuration, the gas burner is supported by the frame.

Figure 5:
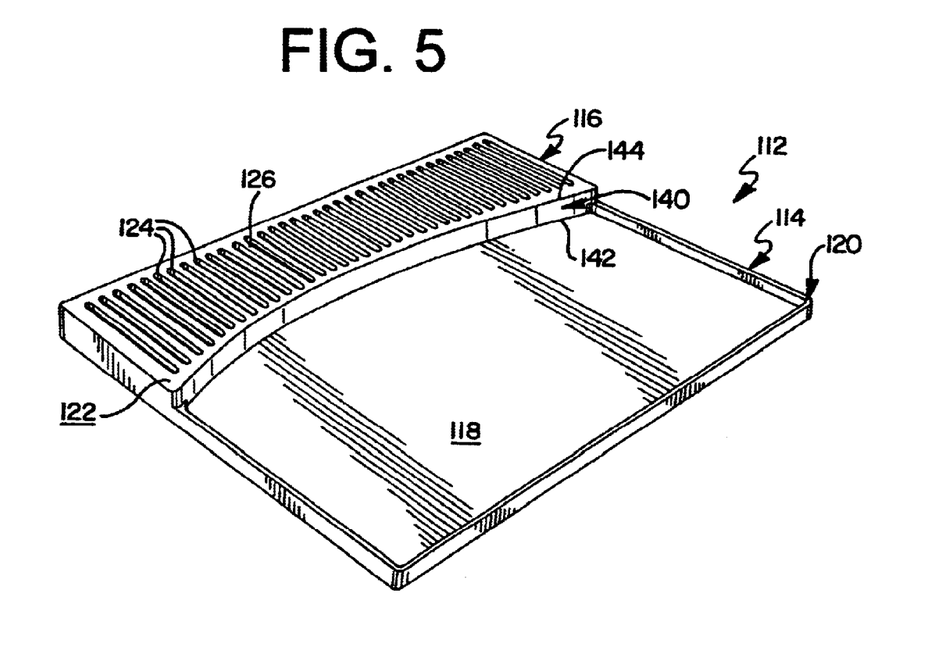
FIG. 5 is a perspective view of another embodiment of the present invention.

In another preferred embodiment shown in FIG. 5, the cooking surface assembly 112 includes a griddle 114 and a grate 116. The griddle has a griddle surface 118 and a peripheral portion 120. The griddle surface 118 is positioned inward of the peripheral portion 120. The griddle 114 resides in a substantially horizontal position.

The grate 116 has a plurality of openings 124 and a plurality of ribs 126, where each rib 126 is positioned between two openings 124. Preferably, the openings 124 are elongated, however, the dimensions and configuration of the openings 124 can vary with the design parameters of the cooking surface assembly 112. The grate 116 has a grate surface 122 resulting from the openings 124. The texture of the surface 122 can vary depending upon the configuration of the openings 124. The grate 116 has a peripheral portion 128.

A transition wall 140 is positioned between the griddle 114 and the grate 116. The transition wall 140 extends between an edge 142 of the griddle 114 and an edge 144 of the grate 116. Preferably, the transition wall 140 is substantially vertical, however, the wall 140 can be angled with a small slope. The transition wall 140 functions as a barrier to aid the cooking of food positioned on the griddle 114. Although shown as having a curvilinear configuration, the dimensions and configuration of the wall 140 can vary with the design parameters of the cooking surface assembly 112.

The grate 116 resides in a plane that is positioned a distance from the plane where griddle 114 resides. Described in a different manner, the grate 116 is vertically offset from the griddle 114. Described in yet another manner, the grate 116 and the griddle 114 are in a stepped positional relationship.

Figure 6:
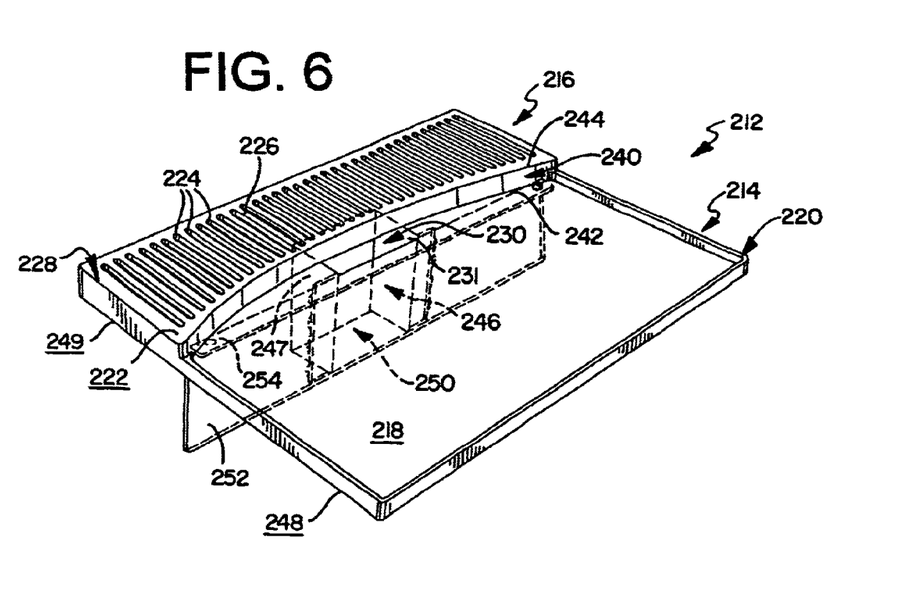
FIG. 6 is a perspective view of another embodiment of the present invention; and, FIG. 7 is a perspective view of another embodiment of the present invention.

In another preferred embodiment shown in FIG. 6, the cooking surface assembly 212 includes a griddle 214 and a grate 216. The griddle has a griddle surface 218 and a peripheral portion 220. The griddle surface 218 is positioned inward of the peripheral portion 220. The griddle 214 resides in a substantially horizontal position. In addition, the griddle 214 has an aperture 230. The aperture 230 has an inner wall 231. The dimensions and configuration of the aperture 230 can vary with the design parameters of the cooking surface assembly 212.

The grate 216 has a plurality of openings 224 and a plurality of ribs 226, where each rib 226 is positioned between two openings 224. Preferably, the openings 224 are elongated, however, the dimensions and configuration of the openings 224 can vary with the design parameters of the cooking surface assembly 212. The grate 216 has a grate surface 222 resulting from the openings 224. The texture of the surface 222 can vary depending upon the configuration of the openings 224. The grate 216 has a peripheral portion 228.

A transition wall 240 is positioned between the griddle 214 and the grate 216. The transition wall 240 extends between an edge 242 of the griddle 214 and an edge 244 of the grate 216. Preferably, the transition wall 240 is substantially vertical, however, the wall 240 can be angled with a small slope. The transition wall 240 functions as a barrier to aid the cooking of food positioned on the griddle 214. Although shown as having a curvilinear configuration, the dimensions and configuration of the wall 240 can vary with the design parameters of the cooking surface assembly 212.

The grate 216 resides in a plane that is positioned a distance from the plane where griddle 214 resides. Described in a different manner, the grate 216 is vertically offset from the griddle 214. Described in yet another manner, the grate 216 and the griddle 214 are in a stepped positional relationship.

A duct 246 depends from a portion of a lower surface of the cooking assembly 212. As shown in FIG. 6, the duct 246 depends from a portion of the lower surface 249 of the grate 216 and from a portion of the lower surface 248 of the griddle 214. The duct 246 has a length $L_D$. An end 247 of the duct 246 is cooperatively positioned with a portion of the openings 224 and the aperture 230 to form a passageway or channel 250. The passageway 250 has a length $L_P$. The passageway 250 is adapted to permit the drainage of grease and other byproducts generated by cooking food on the cooking surface assembly 212 to a lower portion of the cooking chamber 14.

A wall 252 depends from either a lower surface 248 of the griddle 214. Alternatively, the wall 252 depends from a lower surface 249 of the grate 216. Preferably, the wall 252 is positioned proximate the duct 246. Alternatively, the wall 252 is spaced a distance from the duct 246. The wall 252 has a length $L_W$. The wall 252 has a mounting portion 254, which connects the wall 252 to the either the lower surface 248 or the lower surface 249. Fasteners can be used to connect the mounting portion 254. The wall 252 is adapted to provide support to the duct 246. As detailed above, the wall 252 is further adapted to partition a portion of the cooking chamber 14 and form discrete heating zones 90, 92, when the cooking surface assembly 212 is positioned in the cooking chamber 14.

In the use position 70, the passageway 250 permits the drainage and/or removal of grease and other byproducts generated by cooking food on the cooking surface assembly 212 generally away from and substantially past the burner tubes 72, 74, 76. Described in a different manner, the passageway 250 ensures that grease and byproducts drained from the cooking surface assembly 12 avoid contact with the burner tubes 72, 74, 76. Due to its length $L_P$, the passageway 250 permits the drainage and/or removal of grease and byproducts to a lower portion 78 of the cooking chamber 14.

The grease and byproducts generated by cooking food on the griddle 214 are drained and channeled for collection and/or removed by the passageway 250. An accessory utensil, such as a metal spatula, is used to move the grease and byproducts from the griddle 214 to the aperture 230 such that it can drain through the passageway 250. Alternatively, the surface 220 of the griddle 214 can be sloped or angled towards the aperture 230 to facilitate migration of grease and byproducts through the passageway 250.

The grease and byproducts generated by cooking food on grate 216 are drained though the openings 232 and into the passageway 250. Accordingly, there is no need for a sear bar positioned between the grate 216 and the third burner tube 76 to prevent the drainage of grease and byproducts directly onto the third burner tube 76. An accessory utensil is used to move the grease and byproducts from the grate 216 to the openings 232 above the end 247 such that it can drain through the passageway 250.

Alternatively, the duct 246 depends solely from the lower surface 249 of the grate 216. In this configuration, the griddle 214 lacks an aperture 230, and the end 247 of the duct 246 is cooperatively positioned with a portion of the openings 232 to form the passageway 250. The grease and byproducts generated by cooking food on the griddle 214 are drained and channeled for collection and/or removal by the passageway 250. An accessory utensil, such as a metal spatula, is used to move the grease and byproducts from the griddle 214 to the passageway 250. The grease and byproducts generated by cooking food on grate 216 are similarly drained though the openings 232 and into the passageway 250. In this configuration, a sear bar can be omitted from the cooking surface assembly 212.

Figure 7:
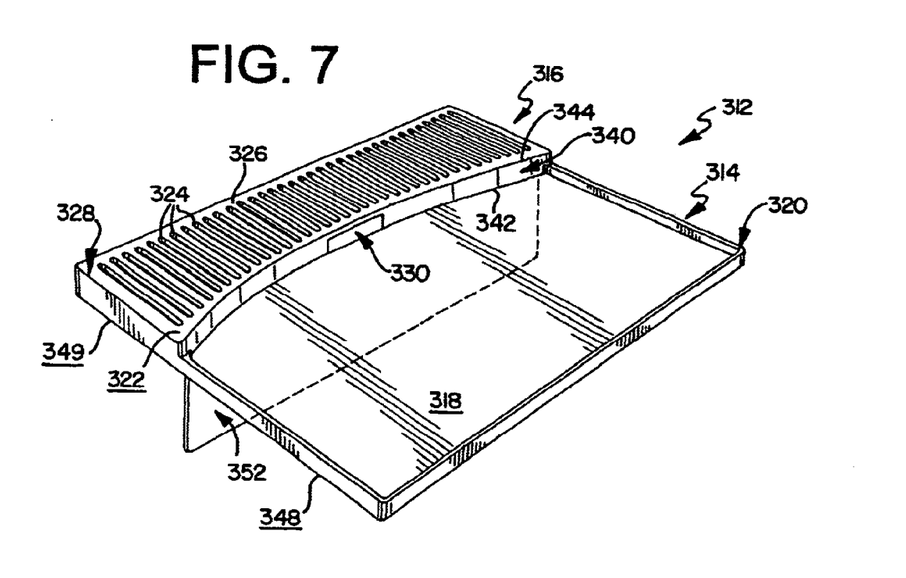

In another preferred embodiment shown in FIG. 7, the cooking surface assembly 312 includes a first portion or griddle 314 and a second portion or grate 316. The first portion 314 has a griddle surface 318 and a peripheral portion 320. The griddle surface 318 is positioned inward of the peripheral portion 320. The first portion 314 resides in a substantially horizontal position.

The second portion 316 has a plurality of openings 324 and a plurality of ribs 326, where each rib 326 is positioned between two openings 324. Preferably, the openings 324 are elongated, however, the dimensions and configuration of the openings 324 can vary with the design parameters of the cooking surface assembly 312. The second portion 316 has a grate surface 322 resulting from the openings 324. The texture of the surface 322 can vary depending upon the configuration of the openings 324. The second portion 316 has a peripheral portion 328.

A transition wall 340 is positioned between the first portion 314 and the second portion 316. The transition wall 340 extends between an edge 342 of the first portion 314 and an edge 344 of the second portion 316. Preferably, the transition wall 340 is substantially vertical, however, the wall 340 can be angled with a small slope. The transition wall 340 functions as a barrier to aid the cooking of food positioned on the first portion 314. Although shown as having a curvilinear configuration, the dimensions and configuration of the wall 340 can vary with the design parameters of the cooking surface assembly 312.

As shown in FIG. 7. an aperture 330 is positioned in a portion of the transition wall 330. The aperture 330 is adapted to receive grease and other byproducts generated during the cooking process on the cooking surface assembly 312. Although shown as being generally rectangular, the configuration and dimensions of the aperture 330 can vary with the design parameters of the cooking surface assembly 312.

A wall 352 depends from a lower surface 348 of the first portion 314. Alternatively, the wall 352 depends from a lower surface 349 of the second portion 316. The wall 352 has a length $L_W$. The wall 352 has a mounting portion (not shown), which connects the wall 352 to the either the lower surface 348 or the lower surface 349. Fasteners can be used to connect the mounting portion. As detailed above, the wall 352 is further adapted to partition a portion of the cooking chamber 14 when the cooking surface assembly 312 is positioned in the cooking chamber 14. Accordingly, the wall 352 partitions and substantially defines the cooking chamber 14 to form the discrete heating zones 90, 92. The first portion 314 is positioned above the first heating zone 90 and the second portion 316 is positioned above the second heating zone 92. The heating zones 90, 92 are bounded by the lower surfaces 348, 349, the walls 80, 82, 84, 86 of the cooking chamber 14, the wall 52, and the burner areas 94, 96. The burner areas 94, 96 are adapted to independently heat the heating zones 90, 92. This means that burner area 94 primarily heats zone 90 and burner area 96 primarily heats zone 92. Accordingly, the temperature of each heating zone 90, 92 can be controlled with the controls (not shown) that are coupled to the burner areas 94, 96 thereby creating distinct cooking environments for food positioned on the cooking surface assembly 12. For example, the temperature of the first heating zone 90 and the first portion 314 can be greater than the temperature of the second heating zone 92 and the second portion 316. Thus, the cooking process on each of the first and second portions 314, 316 can be precisely controlled and customized.

The grease and byproducts generated from the second portion 316 are drained and/or discharged through the openings 324. A sear bar (not shown) positioned below the second portion 316 receives the discharged grease and byproducts and generally prevents such from contacting the heating element below. The grease and byproducts generated on the first portion 314 are drained and/or discharged through the aperture 330. Due to the positioning of the aperture 330 and the transition wall 340, the grease and byproducts from the first portion 314 commingle with the grease and byproducts from the second portion 316 and drain beneath the second portion 316. Accordingly, the commingled grease and byproducts come into contact with the sear bar.

The second portion 316 resides in a plane that is positioned a distance from the plane where first portion 314 resides. Described in a different manner, the second portion 316 is vertically offset from the first portion 314. Described in yet another manner, the second portion 316 and the first portion 314 are in a stepped positional relationship.

While specific embodiments have been illustrated and described, numerous modifications come to mind without significantly departing from the spirit of the invention and the scope of protection is only limited by the scope of the accompanying claims.

What is claimed is:

1. A cooking surface assembly for use within a cooking chamber of a barbecue grill, the cooking surface assembly comprising:
   a first portion having a substantially flat griddle surface and an aperture;
   a second portion having a plurality of openings in the cooking surface assembly forming a grate surface; and,
   a wall depending from a lower surface of the cooking surface assembly.

2. The cooking surface assembly of claim 1 wherein a peripheral portion of the cooking surface assembly is adapted to engage an inner surface of the cooking chamber to support the cooking surface assembly in a use position, wherein the first portion is positioned above a first burner area of the gas burner and the second portion is positioned above a second burner area of the gas burner, said wall depending from the lower surface being positioned between said first and second burner area and adapted to thereby substantially separate said burner areas.

3. A barbecue grill assembly comprising:
   a cooking chamber having a gas burner positioned in a lower portion of the cooking chamber wherein the gas burner has a first burner area and a second burner area substantially defined by a wall positioned within the cooking chamber, the cooking chamber further having a cooking surface assembly;
   the cooking surface assembly having a first portion with a substantially flat griddle surface and an aperture wherein the first burner area is positioned generally below the griddle surface, the cooking surface assembly further having a second portion with a plurality of openings forming a grate surface, and a duct depending from a lower surface of the first portion wherein the second burner area is generally positioned below the grate surface and wherein the duct is cooperatively positioned with the aperture to form a passageway into the lower portion of the cooking chamber.

4. The barbecue grill assembly of claim 3 wherein the wall depends from a lower surface of the cooking surface assembly.

5. The barbecue grill assembly of claim 3 wherein the first and second burner areas have independent controls adapted for independent heat adjustment of the zones of the chamber.

6. An outdoor cooking device comprising:
   a cooking chamber having a gas burner positioned in a lower portion of the cooking chamber, the cooking chamber having a first zone cooperatively positioned with a first burner area and a second zone cooperatively positioned wit a second burner area; and,
   a cooking surface assembly removably positioned within the cooking chamber, the cooking surface assembly having: (i) a first portion with a generally flat griddle surface and an aperture wherein the griddle surface is positioned generally above the first burner area, (ii) a second portion with a plurality of openings forming a grate surface wherein the grate surface is positioned generally above the second burner area, (iii) a duct depending from a lower surface of the first portion wherein the duct is cooperatively positioned with the aperture to form a channel adapted to drain grease generated by cooking food on the cooking surface assembly into the lower portion of the cooking chamber, and (iv) a wall depending from a lower surface of the cooking surface assembly, the wall substantially dividing the first zone and the second zone.

7. A cooking surface assembly for use within a cocking chamber of a barbecue grill, the cooking surface assembly comprising:
   a first portion having a substantially flat griddle surface and an aperture;
   a second portion having a plurality of openings forming a grate surface, wherein a gas burner is positioned below the grate surface and a sear bar is positioned between the grate surface and the gas burner; and,
   a duct depending from a lower surface of the first portion, the duct having a length, the duct cooperatively positioned with the aperture to form a passageway for grease to pass from the griddle surface through the passageway and into a lower portion of the cooking chamber.

8. A cooking surface assembly for with use within a cooking chamber of a barbecue grill, the cooking surface assembly comprising:
   a first portion having a substantially flat griddle surface and an aperture;
   a second portion having a plurality of openings forming a grate surface; and,
   a duct depending from a lower surface of the first portion, the duct having a length, the duct cooperatively positioned with the aperture to form a passageway, the passageway is adapted to facilitate the drainage of grease generated by cooking food on the cooking surface assembly generally away from a gas burner positioned in a lower portion of the cooking chamber; and,
   a wall depending from the lower surface, the wall having a length, the wall positioned adjacent the duct.

9. The cooking surface assembly of claim 8 wherein the cooking surface assembly is removably positioned within the cooking chamber.

10. The cooking surface assembly of claim 8 wherein a peripheral portion of the cooking surface assembly is adapted to engage an inner surface of the cooking chamber to support the cooking surface assembly in a use position, wherein the first portion is positioned above a first burner area of the gas burner and the second portion is positioned above a second burner area of the gas burner.

11. The cooking surface assembly of claim 10 wherein the cooking chamber has a first zone and a second zone, the first zone cooperatively positioned with the first burner area, the second zone cooperatively positioned with the second burner area.

12. The cooking surface assembly of claim 11 wherein the first and second zones are divided by the wall depending from a lower surface of the cooking surface assembly, the first burner area adapted to independently heat the first zone and the second burner area adapted to independently heat the second zone.

13. The cooking surface assembly of claim 8 wherein the cooking surface assembly has a configuration that is generally rectangular.

14. The cooking surface assembly of claim 8 wherein the cooking surface assembly has a curvilinear peripheral portion.

15. A cooking surface assembly for with use within a cooking chamber of a barbecue grill, the cooking surface assembly adapted to be positioned above a gas burner located in a lower portion of the cooking chamber, the cooking surface assembly comprising:

a first portion having a substantially flat griddle surface;

a second portion having a plurality of openings forming a grate surface;

a generally vertical transition wall between the first and second portions;

an aperture positioned in a portion of the transition wall, the aperture adapted to receive grease and byproducts generated while cooking food on the griddle surface.

16. The cooking surface assembly of claim 15 further comprising a wall depending from the lower surface and being positioned adjacent the aperture.

17. The cooking surface assembly of claim 15 wherein a peripheral portion of the cooking surface assembly is adapted to engage an inner surface of the cooking chamber to support the cooking surface assembly in a use position, wherein the first portion is positioned above a first burner area of the gas burner and the second portion is positioned above a second burner area of the gas burner.

18. The cooking surface assembly of claim 17 wherein the cooking chamber has a first zone and a second zone, the first zone cooperatively positioned with the first burner area, the second zone cooperatively positioned with the second burner area.

19. The cooking surface assembly of claim 18 wherein the first and second zones are divided by a wall depending from a lower surface of the cooking surface assembly, the first burner area adapted to independently heat the first zone and the second burner area adapted to independently heat the second zone.

20. The cooking surface assembly of claim 15 wherein the cooking surface assembly is formed from cast material.

21. A cooking surface assembly for use within a cooking chamber of a barbecue grill, the cooking surface assembly positioned above a gas burner located in a lower portion of the cooking chamber, the cooking surface assembly comprising:

a first portion having a substantially flat griddle surface;

a second portion having a plurality of openings forming a grate surface; and, a generally vertical transition wall between the first and second portions, the transition wall having an aperture adapted to receive grease and byproducts generated while cooking food on the griddle surface.

22. A cooking surface assembly for use within a cooking chamber of a barbecue grill, the cooking surface assembly positioned above a gas burner located in a lower portion of the cooking chamber, the cooking surface assembly comprising:

a first portion having a substantially flat griddle surface;

a second portion having a plurality of openings forming a grate surface; a generally vertical transition wall between the first and second portions; and, a wall depending from a lower surface of the cooking surface assembly.

23. The cooking surface assembly of claim 22 wherein a peripheral portion of the cooking surface assembly is adapted to engage an inner surface of a cooking chamber to support the cooking surface assembly in a use position, wherein the first portion is positioned above a first burner area of the gas burner and the second portion is positioned above a second burner area of the gas burner.

24. The cooking surface assembly of claim 23 wherein the depending wall is configured to substantially divide the first burner area from the second burner area.

25. A cooking surface assembly for use within a cooking chamber of a barbecue grill, the cooking surface assembly positioned above a gas burner located in a lower portion of the cooking chamber, the cooking surface assembly comprising:

a first portion having a substantially flat griddle surface;

a second portion having a plurality of openings forming a grate surface;

a generally vertical transition wall between the first and second portions, the transition wall having an aperture adapted to receive grease and byproducts generated while cooking food on the griddle surface; and, a duct depending from a lower surface of the first portion wherein the duct is cooperatively positioned with the aperture to form a passageway.

\* \* \* \* \*